(12) United States Patent
Nishida et al.

(10) Patent No.: US 7,843,190 B2
(45) Date of Patent: Nov. 30, 2010

(54) POSITION DETECTION APPARATUS

(75) Inventors: Sosuke Nishida, Tokyo (JP); Toshinori Takatsuka, Tokyo (JP)

(73) Assignee: Asahi Kasei Emd Corporation, Tokyo (JP)

( * ) Notice: Subject to any disclaimer, the term of this patent is extended or adjusted under 35 U.S.C. 154(b) by 0 days.

(21) Appl. No.: 12/097,729

(22) PCT Filed: Dec. 14, 2006

(86) PCT No.: PCT/JP2006/324926
§ 371 (c)(1),
(2), (4) Date: Jun. 16, 2008

(87) PCT Pub. No.: WO2007/069680
PCT Pub. Date: Jun. 21, 2007

(65) Prior Publication Data
US 2009/0045807 A1    Feb. 19, 2009

(30) Foreign Application Priority Data
Dec. 16, 2005 (JP) .............................. 2005-364090

(51) Int. Cl.
*G01B 7/14*    (2006.01)
(52) U.S. Cl. .............................. 324/207.2; 324/207.24; 324/207.21
(58) Field of Classification Search .............. 324/207.2, 324/207.24, 207.21
See application file for complete search history.

(56) References Cited

U.S. PATENT DOCUMENTS

| 3,082,507 A | 3/1963 | Kuhrt et al. |
| 4,195,305 A | 3/1980 | Moon |
| 4,236,165 A | 11/1980 | Kawashima et al. |
| 4,668,100 A | 5/1987 | Murakami et al. |

(Continued)

FOREIGN PATENT DOCUMENTS

EP    0 548 375 A1    6/1993

(Continued)

OTHER PUBLICATIONS

European Search Report and Communication for European Patent Application No. 07008331.6, dated Jul. 3, 2007. (11 pages).

(Continued)

*Primary Examiner*—Reena Aurora
(74) *Attorney, Agent, or Firm*—Finnegan, Henderson, Farabow, Garrett & Dunner, LLP

(57) ABSTRACT

A magnetic flux detection unit and a rectangular solid magnet are provided. The magnetic flux detection unit includes one or more pairs of Hall sensors, each pair having two Hall sensors arranged on a substrate. The solid magnet is arranged movably in a direction in a plane parallel to the substrate. Each pair of two Hall sensors is arranged on the substrate so that a line connecting the centers of magnetism sensing sections of each pair of two Hall sensors is orthogonal to a movement direction of the magnet. A tetragon has a long side and a short side and the long side has a inclination angle to the line connecting the centers of magnetism sensing sections of the each pair of two Hall sensors. The magnet has one N-pole and one S-pole separately magnetized in orthogonal to the substrate on which the Hall sensors are arranged.

9 Claims, 13 Drawing Sheets

U.S. PATENT DOCUMENTS

| | | | |
|---|---|---|---|
| 4,690,714 | A | 9/1987 | Li |
| 4,782,375 | A | 11/1988 | Popovic |
| 4,987,467 | A | 1/1991 | Popovic |
| 5,184,106 | A | 2/1993 | Partin et al. |
| 5,198,795 | A | 3/1993 | Shibasaki et al. |
| 5,385,864 | A | 1/1995 | Kawasaki et al. |
| 5,430,310 | A | 7/1995 | Shibasaki et al. |
| 5,453,727 | A | 9/1995 | Shibasaki et al. |
| 5,491,461 | A | 2/1996 | Partin et al. |
| 5,621,320 | A | 4/1997 | Yokotani et al. |
| 5,804,475 | A | 9/1998 | Meyer et al. |
| 5,883,564 | A | 3/1999 | Partin |
| 6,100,546 | A | 8/2000 | Major et al. |
| 6,175,233 | B1 | 1/2001 | McCurley et al. |
| 6,590,389 | B1 | 7/2003 | Shibasaki et al. |
| 6,630,882 | B1 | 10/2003 | Heremans et al. |
| 6,809,514 | B2 | 10/2004 | Ashley et al. |
| 6,861,679 | B2 | 3/2005 | Otsuka et al. |
| 2001/0055002 | A1 | 12/2001 | Endo |
| 2002/0009192 | A1 | 1/2002 | Nakamura |

FOREIGN PATENT DOCUMENTS

| | | |
|---|---|---|
| EP | 0 810 544 A2 | 12/1997 |
| EP | 1 124 271 A1 | 8/2001 |
| EP | 1 211 517 A2 | 6/2002 |
| JP | 48-32619 | 10/1973 |
| JP | 55-132033 | 10/1980 |
| JP | 55-132066 | 10/1980 |
| JP | 59-006752 | 1/1984 |
| JP | 59-048970 | 3/1984 |
| JP | 59-159578 | 9/1984 |
| JP | 59-228759 | 12/1984 |
| JP | 62-174984 | 7/1987 |
| JP | 63-55227 | 11/1988 |
| JP | 64-9302 | 1/1989 |
| JP | 02-272782 | 11/1990 |
| JP | 03-288483 | 12/1991 |
| JP | 04-279071 | 10/1992 |
| JP | 05-297084 | 11/1993 |
| JP | 06-077556 | 3/1994 |
| JP | 06-125122 | 5/1994 |
| JP | 06-224488 | 8/1994 |
| JP | 6-229708 | 8/1994 |
| JP | 07-193297 | 7/1995 |
| JP | 07-249805 | 9/1995 |
| JP | 07-283390 | 10/1995 |
| JP | 08-088423 | 4/1996 |
| JP | 08-204251 | 8/1996 |
| JP | 08-242027 | 9/1996 |
| JP | 09-116207 | 5/1997 |
| JP | 09-203748 | 8/1997 |
| JP | 09-219547 | 8/1997 |
| JP | 09-231889 | 9/1997 |
| JP | 10-233539 | 2/1998 |
| JP | 30-69545 | 2/1998 |
| JP | 10-074308 | 3/1998 |
| JP | 27-93440 | 6/1998 |
| JP | 11-183579 | 7/1999 |
| JP | 2000-35469 | 2/2000 |
| JP | 2000-183424 | 6/2000 |
| JP | 2001-111135 | 4/2001 |
| JP | 2001-0058109 | 5/2001 |
| JP | 2001-352369 | 12/2001 |
| JP | 2002-229090 | 8/2002 |
| JP | 2002-243407 | 8/2002 |
| JP | 2002-287891 | 10/2002 |
| JP | 2003-214897 | 7/2003 |
| JP | 2003-315088 | 11/2003 |
| JP | 2004-245765 | 9/2004 |
| JP | 2004-348173 | 12/2004 |
| JP | 2005-284169 | 10/2005 |
| TW | 411654 | 11/2000 |
| WO | WO 98/38519 | 9/1998 |
| WO | WO 02/086694 | 10/2002 |
| WO | WO 2004/113845 A1 | 12/2004 |

OTHER PUBLICATIONS

European Supplementary Search Report for European Patent Application No. 03700583.2 dated Jun. 18, 2007. (7 pages).

Office Action, USPTO, U.S. Appl. No. 10/491,276, mailed Nov. 2, 2005. (7 pages).

Office Action, USPTO, U.S. Appl. No. 10/491,276, mailed Mar. 10, 2006. (8 pages).

Advisory Action, USPTO, U.S. Appl. No. 10/491,276, mailed Jun. 15, 2006. (3 pages).

Office Action, USPTO, U.S. Appl. No. 10/491,276, mailed Aug. 2, 2006. (9 pages).

Office Action, USPTO, U.S. Appl. No. 10/491,276, mailed Feb. 16, 2007. (9 pages).

N. Kuze et al., "Molecular beam epitaxial growth of InAs/AlGaAsSb deep quantum well structures on GaAs substrates,," J. Vac. Sci. Technol. B 16(5), Sep./Oct. 1998, American Vacuum Society, pp. 2644-2649.

Notice of Allowance, USPTO, U.S. Appl. No. 10/491,276, mailed Jul. 31, 2007. (6 pages).

Notice of Allowance, USPTO, U.S. Appl. No. 10/491,276, mailed Jan. 10, 2008. (6 pages).

Office Action dated Jan. 29, 2010 in corresponding Chinese Patent Application No. 2006-80047407.3.

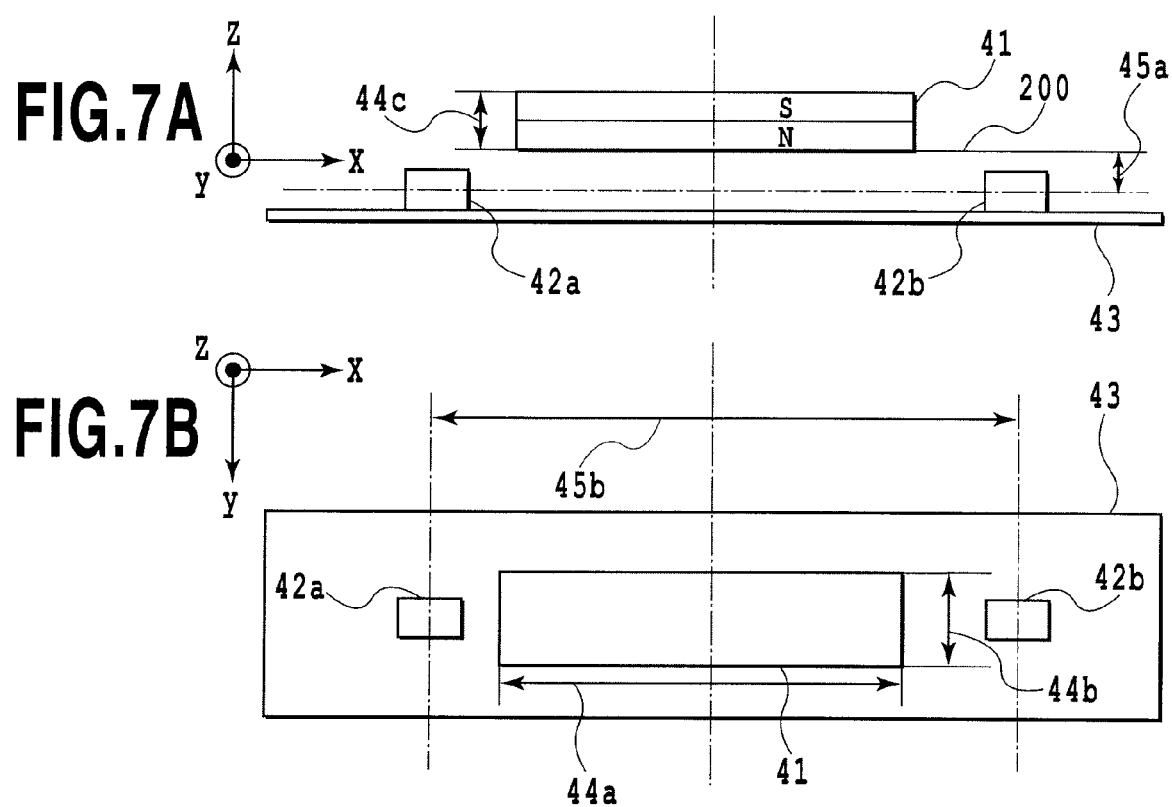

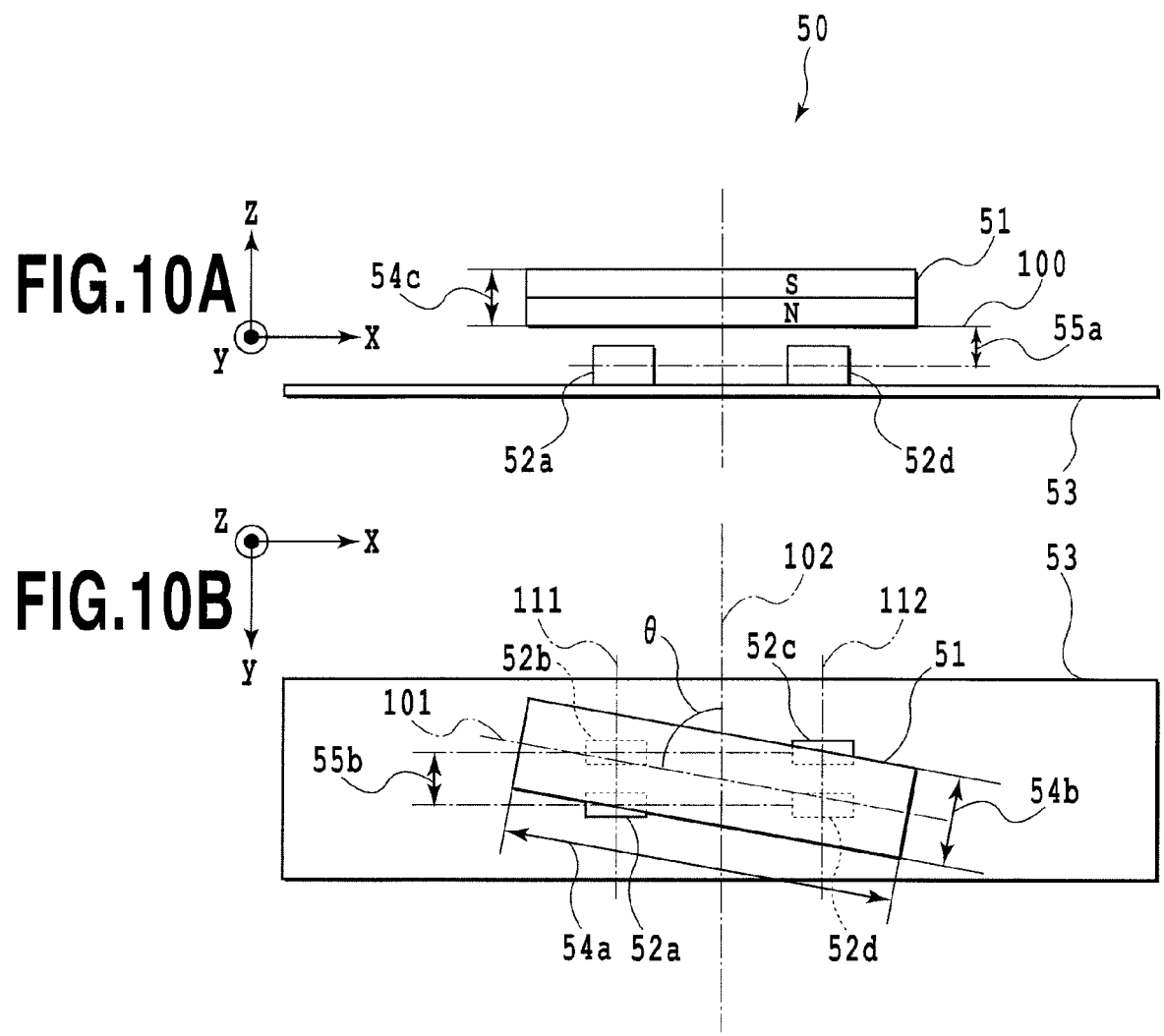

| DESIRED POSITION DETECTION RANGE (mm) | LENGTH OF MAGNET IN LONG SIDE DIRECTION (mm) |
|---:|---:|
| 10 | 10.8 |
| 9 | 10.1 |
| 8 | 9.3 |
| 7 | 8.6 |
| 6 | 7.9 |
| 5 | 7.1 |
| 4 | 6.5 |
| 3 | 5.8 |
| 2 | 5.2 |

FIG.12

POSITION DETECTION APPARATUS

TECHNICAL FIELD

The present invention relates to a position detection apparatus using a magnet and Hall sensors.

BACKGROUND ART

In recent years, various types of sensors have been used in all fields. For example, hand movement correction apparatuses used in a digital still camera, digital video camera or the like, or lens position detection apparatuses used for zooming or automatic focusing may need a sensor having a function of performing position detection instantaneously with high precision. At the same time, with recent increasing demands for miniaturization of the entire apparatus miniaturization of the sensor may be required in itself. Further, sensors having such characteristics as extension of life and being hard to be affected by dust, oil (grease) and the like may be required.

In order to satisfy the above requirements, a position detection method using a magnetic sensor as the sensor is a well known technique.

For example, as the magnetic sensor, a method described in Patent Document 1 and the like mat be changed or revised. More specifically, as shown in FIG. 3 of Patent Document 1, the method discloses a technique that a moving part includes a magnet and the movement of the moving part is detected using a plurality of magnetic sensors.

The present inventors have hitherto discloses a position detection apparatus described in Patent Document 2 and so on. Presently, this position detection mechanism is widely used as a key part of a vibration compensation apparatus of a digital still camera.

There will now be described the principle and configuration of performing position detection using several magnetic sensors.

FIG. 13 shows a position detection method using Hall sensors 11 and 12 as a magnetic sensor.

In FIG. 13, a permanent magnet 23 is arranged opposite to the two Hall sensors 11 and 12 that are arranged with a predetermined distance. Respective Hall output voltages of the two Hall sensors 11 and 12 are varied according to a variation in magnetic flux density due to movement in a lateral direction (arrow direction). A differential value between Hall output voltages is processed by a differential signal processing circuit to detect a position of the permanent magnet 23. In the position detection, the movement direction of the permanent magnet 23 is parallel to a line along the two Hall sensors 11 and 12.

Typically, in order to reduce a burden of calibration, the size of the permanent magnet 23, the distance between the Hall sensors 11 and 12, and the distance between the Hall sensors 11 and 12 and the permanent magnet 23 are designed so that the differential value between the Hall output voltages is varied linearly contrast to the movement distance of the permanent magnet 23 in a lateral direction.

The configuration shows a satisfactory characteristic when the relative movement distance of the magnet and Hall sensors is several mm or less. Thus, the configuration is used as a key part of a vibration compensation apparatus of a single-lens reflex digital camera. However, when the movement distance is larger than several mm, there is a problem that whole mechanism becomes larger. Thus, practical use of the configuration cannot be reached.

Further, when position detection is performed in a wide temperature range with high precision, the position detection may be performed such that variation of a characteristic due to variations in ambient temperature of the Hall sensor and magnet is suppressed by using an output signal processing method described in Patent Document 6.

In a method of position detection with a narrow range, one-axis direction position detection may be performed using a magnet and a single Hall sensor arranged as shown in FIG. 6 of Patent Document 5, so as to reduce the number of components.

Also, in a method of position detection requiring high precision with a narrow range, position detection may be performed using specially-arranged two magnets as described in Patent Document 4.

In a method of position detection requiring high precision with a wide range, position detection may be performed using a special magnet as shown in Patent Document 3 such that linearity of the difference between Hall output voltages of the two Hall sensors contrast to the lateral movement distance of permanent magnet is improved.

Meanwhile, when position detection is performed with a wide range of approximately 10 mm that is required by the lens position detection apparatus used for zooming or auto focusing in a digital still camera or digital video camera, a method using an encoder is generally known. However, when an encoder is used, there is a problem that a complicated processing circuit including a counter for processing a signal outputted from the sensor. Further, when there occurs loss of synchronism between the movement device and encoder, a desired characteristic cannot be achieved, and thus the method is not suitable for high-speed movement objects.

As a method that is used for position detection with a wide range of approximately 10 mm and that does not include an encoder, there may be used a magnetic resistance element as shown in Patent Documents 7 and 8. This method is a well known technique that a rectangular shaped magnet (or a magnetic body) is inclined to a movement direction and a magnetic resistance element is arranged in a direction orthogonal to the movement direction. Thus, lateral movement of the moving body can be detected according to a variation of a longitudinal magnetic field.

[Patent Document 1] Japanese Patent Laid-Open No. 2002-287891

[Patent Document 2] WO 02/086694

[Patent Document 3] Japanese Patent Laid-Open No. 2005-284169

[Patent Document 4] Japanese Patent Laid-Open No. 2004-245765

[Patent Document 5] Japanese Patent Laid-Open No. 2002-229090

[Patent Document 6] Japanese Patent Laid-Open No. 2004-348173

[Patent Document 7] Japanese Patent Laid-Open No. 59-159578

[Patent Document 8] Japanese Patent Laid-Open No. 6-229708

DISCLOSURE OF THE INVENTION

In recent years, demands are increased to perform position detection with a wide range by using a magnetic sensor that is a non-contact type and longer life and that is hard to be affected by dirt, dust or the like.

If a technique of the position detection apparatus of Patent Document 2 proposed by the present inventors is used, a stroke of 2 to 3 mm that is required by the position detection for vibration compensation is performed with a high precision as 0.1% or so, and thus the technique may be used in a widespread field. However, in the conventional art, position detection with a wide range of 10 mm that is required by the lens position detection apparatus for camera zooming or auto focusing cannot be performed with the same high precision.

Further, as a magnetic sensor, when position detection with a wide range is performed using such a method as described in Patent Document 3, since the magnet used is not a general-purpose one, it is difficult to fabricate the magnet. In addition, since it is difficult to form a uniform magnet shape, the instability of a magnetic characteristic may be increased or the acquisition of such magnet may be difficult.

Also, in a configuration that position detection with a wide range is performed using a method described in a later-described comparative example (the technique described in Patent Document 1), when a design is made so that the differential value between Hall output voltages is varied linearly to the movement distance of the permanent magnet in a lateral direction, the magnet size, the distance between the two Hall sensors, and the distance between the Hall sensor and magnet become large and thus it is difficult to miniaturize the position detection apparatus. Since miniaturization is strongly required in a mobile apparatus such as a digital still camera, the configuration is not practical.

Also, in a method as described in Patent Documents 4 and 5, it is theoretically difficult to dispose a magnet so that the output from a Hall sensor is varied linearly with a wide range. Thus it is impossible to perform position detection with a wide range of 10 mm that is required by a lens position detection apparatus for camera zooming or auto focusing.

From the above described reasons, a position detection apparatus using a magnet with a high precision of 0.1% to position detection range has become practical use only within the limitation that the movement distance of the magnet is several mm or less.

As described in Patent Document 7, when a magnet resistance element using semiconductor thin film is used, a bias magnet is generally used so that the output of the magnetic resistance element using semiconductor thin film is varied linearly to magnetic flux density. In this case, however, the number of components increases and thus the size of mechanism becomes larger.

Further, in a magnetic resistance element using ferromagnetic thin film as described in Patent Document 8, magnetic saturation must be avoided, and thus the degree of freedom of the design cannot be obtained.

Also, since ferromagnetic thin film has hysteresis, high-precision position detection cannot be performed. When high-precision position detection is performed with a wide range, a method of using a bias magnet for suppressing effects of hysteresis is disclosed as described in Patent Document 8. In this case, however, the number of components increases and thus the size of mechanism becomes larger. Further, attraction and repulsion may be occurred between a position detection magnet and a bias magnet, and thus the control of position may be complicated.

Also, since the magnet resistance element using ferromagnetic thin film detects a magnetic field in a horizontal direction to the surface of the sensor, the element cannot be positioned so as to utilize the energy of magnet most efficiently (cannot be positioned so as to face the magnetization surface of magnet). Thus, the size of the magnet must be increased to obtain a magnetic field enough for position detection.

From the above described various reasons, in the position detection apparatus using a magnetic resistance element actually incorporated in a linear displacement sensor or the like, the precision requirement (1.0% or less to position detection range) of position detection used in a digital video camera, digital video camera or the like cannot be satisfied. Thus, the precision is fastened to only 2.0% or so to movement range so far.

Thus, an object of the present invention is to provide a position detection apparatus with miniaturization, a simple circuit configuration, and a function for detecting a distance in a wide range with high precision, even though a component using a magnetic sensor as a Hall sensor may be composed of a general-purpose article or easily-available part.

The present inventors paid attention to a large difference of precision between about 0.1% and 2.0% regarding position detection range, and carefully studied an essential difference between a detection system using a Hall sensor and a detection system using a magnetic resistance element. As a result, the conclusion is made in that the magnetic resistance element detects an object per a surface unit but the Hall sensor detects the object per a point unit.

As to the explanation of the operation of a magnetic resistance element, many text books teach that a moving magnet produces a uniform magnetic field. In practice, however, the uniform magnetic field exists only when an infinite-length magnet is hypothetically used, and thus the dispersion of the magnetic field always exists on a surface. When a semiconductor magnetic resistance element is used, the output is related to $B^2$ (the square of B), and thus an error of average always occurs. Thus, a difference of several % may be represented as the output to the case where it is assumed that uniform magnetic field exists. In the case of ferromagnetic resistance element, non-linearity of the output causes the error of average. Further, the magnetism sensing section itself constitutes a magnetic circuit, and thus microscopic distribution becomes more complexity.

More specifically, it was concluded that an effect of in-plane magnetic field distribution is used as a new parameter for the detection system where a magnetic resistance element is used, thus reducing detection precision.

Thus, the present inventors made an attempt to study the possibility of constructing a detection system with a wide range and high precision by using of a Hall sensor that is not effected by magnetic field distribution.

To solve the above problems, a position detection apparatus according to the present invention comprises: a magnetic flux detection means having one or more pairs of Hall sensors, each pair comprised of two Hall sensors, each Hall sensor arranged on a substrate and having a magnetism sensing direction orthogonal to a substrate; and a rectangular solid magnet having an N-pole and an S-pole magnetized in a direction orthogonal to the substrate, wherein the rectangular solid magnet is arranged movably in a direction orthogonal to a line connecting the centers of magnetism sensing sections of the each pair of two Hall sensors and is arranged movably in a plane parallel to the substrate, wherein the rectangular solid magnet has a long side and a short side of a quadrangle when the rectangular solid magnet is projected on any plane parallel to the substrate; and wherein the long side of the rectangular solid magnet has a predetermined inclination angle to the line connecting the centers of magnetism sensing sections of the each pair of two Hall sensors of the magnetic flux detection means.

The "Movably in a direction orthogonal to a line connecting the centers of magnetism sensing sections of the each pair of two Hall sensors and movably in a plane parallel to the substrate" means that when a line connecting the centers of magnetism sensing sections of the Hall sensors and a line indicating a direction of magnet movement are projected on any identical plane parallel to the substrate, respective extended lines thereof cross at right angles.

The "The long side of the rectangular solid magnet has a predetermined inclination angle relative to the line connecting the centers of magnetism sensing sections of the each pair of two Hall sensors in the magnetic flux detection means" means that when a line containing the long side of the rectangular solid magnet and a line connecting the centers of magnetism sensing sections of the two Hall sensors are projected on any identical plane parallel to the substrate, respective extended lines thereof cross at a predetermined angle.

Also, according to the present invention, the magnetic flux detection means having one or more pairs of Hall sensors, each pair being constituted of two Hall sensors, is preferably arranged opposite a surface of the S-pole or the N-pole of the rectangular solid magnet. The above expression "the magnetic flux detection means having one or more pairs of Hall sensors, each pair being constituted of two Hall sensors, is arranged opposite a surface of the S-pole or the N-pole of the rectangular solid magnet" means that arrangement is made so that, when the rectangular solid magnet and the magnetism sensing sections of multiple Hall sensors constituting the magnetic flux detection means are projected on any identical plane parallel to the substrate, a projected part of magnetism sensing section of at least one Hall sensor of the multiple Hall sensors is included in a projected part of the rectangular solid magnet.

When a position is detected with a wide range using a magnetic resistance element, the magnetic resistance element typically has a large magnetism sensing section (the size of magnetism sensing section of a typical semiconductor magnetic resistance element being about 2400 μm×2000 μm) and detects a magnetic field in a wide range, compared to a Hall sensor. Thus, the precision may be affected by the magnetic field distribution (the magnetic field being not uniform in the magnetism sensing plane) in the magnetism sensing plane. As a result, a Hall sensor (the size of magnetism sensing section of the Hall sensor being about 100 μm×100 μm), that has a magnetism sensing section significantly smaller than the magnetic resistance element and that can detect a magnetic field over a range being substantially a point, is used. Thus, a position detection apparatus with a significantly high precision can be provided compared to the position detection apparatus using a conventional magnetic resistance element.

The present invention is characterized in that, in the ratio of length between the short side and long side of the rectangular solid magnet in a plane having a movement direction of the rectangular solid magnet, the length of the long side is set to 3.5 or more to 8.0 or less when the length of the short side is set to 1.

Further, the present invention is characterized in that the length of a line connecting the centers of magnetism sensing sections of the each pair of two Hall sensors of the magnetic flux detection means is 1.0 mm or less, and a predetermined inclination angle of a long side direction of the rectangular solid magnet to a line connecting the centers of magnetism sensing sections of the each pair of two Hall sensors of the magnetic flux detection means is 67.0 to 89.3 degrees.

Further, the present invention is characterized in that a position of the rectangular solid magnet can be detected with a precision of 1% or less to a movement range that the rectangular solid magnet is movable.

Further, the present invention is characterized in that a position of the rectangular solid magnet is calculated using a difference of Hall output voltages between the each pair of two Hall sensors of the magnetic flux detection means and a sum of Hall output voltages of the each pair of two Hall sensors of the magnetic flux detection means.

Further, the present invention is characterized in that the Hall sensor is a Hall sensor that does not have a magnetic chip for magnetic amplification.

Further, the present invention is characterized in that the Hall sensor is a Hall sensor that includes III-V family chemical compound semiconductor such as GaAs, InAs or InSb.

The present invention is characterized in that the Hall sensor is a Hall sensor that includes IV family semiconductor such as Si or Ge.

Further, the present invention is characterized in that, the each pair of Hall sensors arranged on the substrate of the magnetic flux detection means are incorporated integrally into a single package.

According to the present invention, it is possible to suppress an effect on detection precision due to non-uniformity in a magnetic field of the magnetism sensing section. Even when constituent components such as magnet and magnetic flux detection means are constructed by using a general-purpose part, easily-available part or the like, miniaturization can be achieved with a simple circuit configuration. Furthermore, a position detection apparatus that detects a distance in a wide range of about 10 mm (such detection being not possible to perform according to the conventional art) with a high precision of 1% or less can be constructed.

BRIEF DESCRIPTION OF THE DRAWINGS

FIG. 7A is a cross-sectional view showing a schematic configuration of a conventional position detection apparatus, as a comparative example, using a magnet and Hall sensors;

FIG. 7B is a top view showing a schematic configuration of the conventional position detection apparatus, as a comparative example, using a magnet and Hall sensors;

FIG. 10A is a cross-sectional view showing a schematic configuration of a position detection apparatus according to a second embodiment of the present invention;

FIG. 10B is a top view showing a schematic configuration of the position detection apparatus according to the second embodiment of the present invention;

FIG. 12 is an explanatory diagram showing a variation in length of a rectangular solid magnet in a long side direction according to a third embodiment of the present invention when a desired position detection range is varied at a pitch of 1 mm.

BEST MODE FOR CARRYING OUT THE INVENTION

Figure 1:
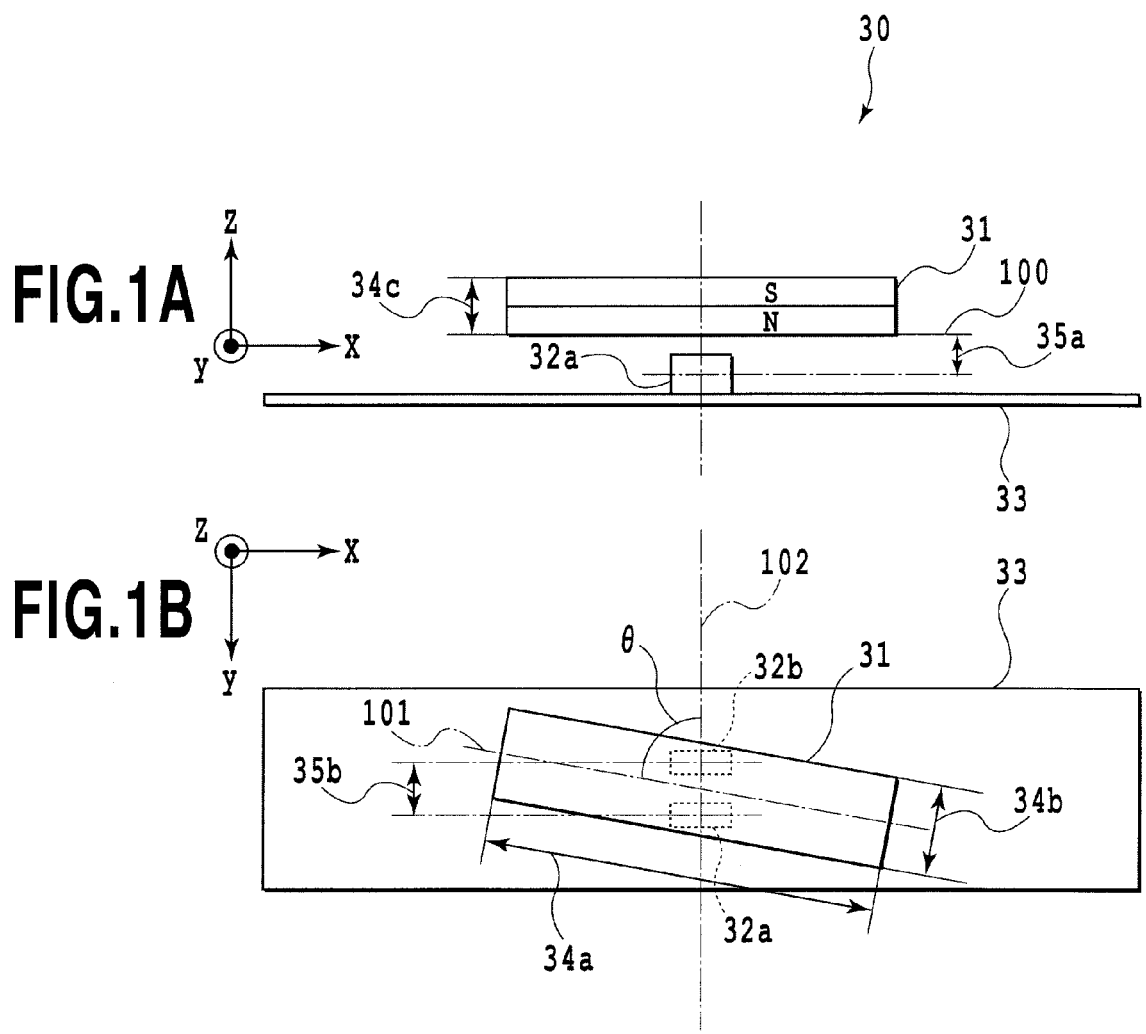
FIG. 1A is a cross-sectional view showing a schematic configuration of a position detection apparatus according to a first embodiment of the present invention.
FIG. 1B is a top view showing a schematic configuration of the position detection apparatus according to the first embodiment of the present invention.

Embodiments of the present invention will be described in detail below with reference to the drawings.

First Example

A first embodiment of the present invention will be described with reference to FIGS. 1 to 9.

A position detection apparatus according to the present invention can be constructed using various shapes of magnets and various types of Hall sensors.

<Configuration>

FIGS. 1A and 1B shows a schematic configuration of a position detection apparatus 30.

Reference numeral 31 denotes a rectangular solid magnet (a magnetic flux generation means) having one N-pole and one S-pole separately magnetized.

Reference numeral 32a and 32b denote each Hall Sensor composing a pair of two Hall sensors (magnetic flux detection means).

Reference numeral 33 denotes a substrate having the Hall sensor 32a (first Hall sensor) and the Hall sensor 32b (second Hall sensor).

The rectangular solid magnet 31 is magnetized in a direction orthogonal to the substrate 33 having the Hall sensors 32a and 32b.

The rectangular solid magnet 31 is arranged movably along an x-direction on a plane 100 facing the substrate 33.

In this case, the direction of a line connecting the center of magnetism sensing section of the Hall sensor 32a with the center of magnetism sensing section of the Hall sensor 32b is set as a Y-direction. The direction orthogonal to the Y-direction is set as an X-direction. The Hall sensors 32a and 32b are constituted as a pair of Hall sensors. The Hall sensors 32a and 32b are arranged at an opposite position to a face of the rectangular solid magnet 31.

Reference numeral 34a denotes a length of the rectangular solid magnet 31 in a long side direction X. Reference numeral 34b denotes a length of the rectangular solid magnet 31 in a short side direction Y. Reference numeral 34c denotes a length of the rectangular solid magnet in a thickness direction Z (a length of the magnet in a magnetization direction).

Reference numeral 35a denotes a distance from the plane 100 of the rectangular solid magnet 31 opposite to the substrate 33 of the Hall sensors 32a and 32b to the center of magnetism sensing section of the Hall sensors 32a and 32b.

Reference numeral 35b denotes a distance between the center of magnetism sensing section of the Hall sensor 32a and the center of magnetism sensing section of the Hall sensor 32b.

Figure 2:
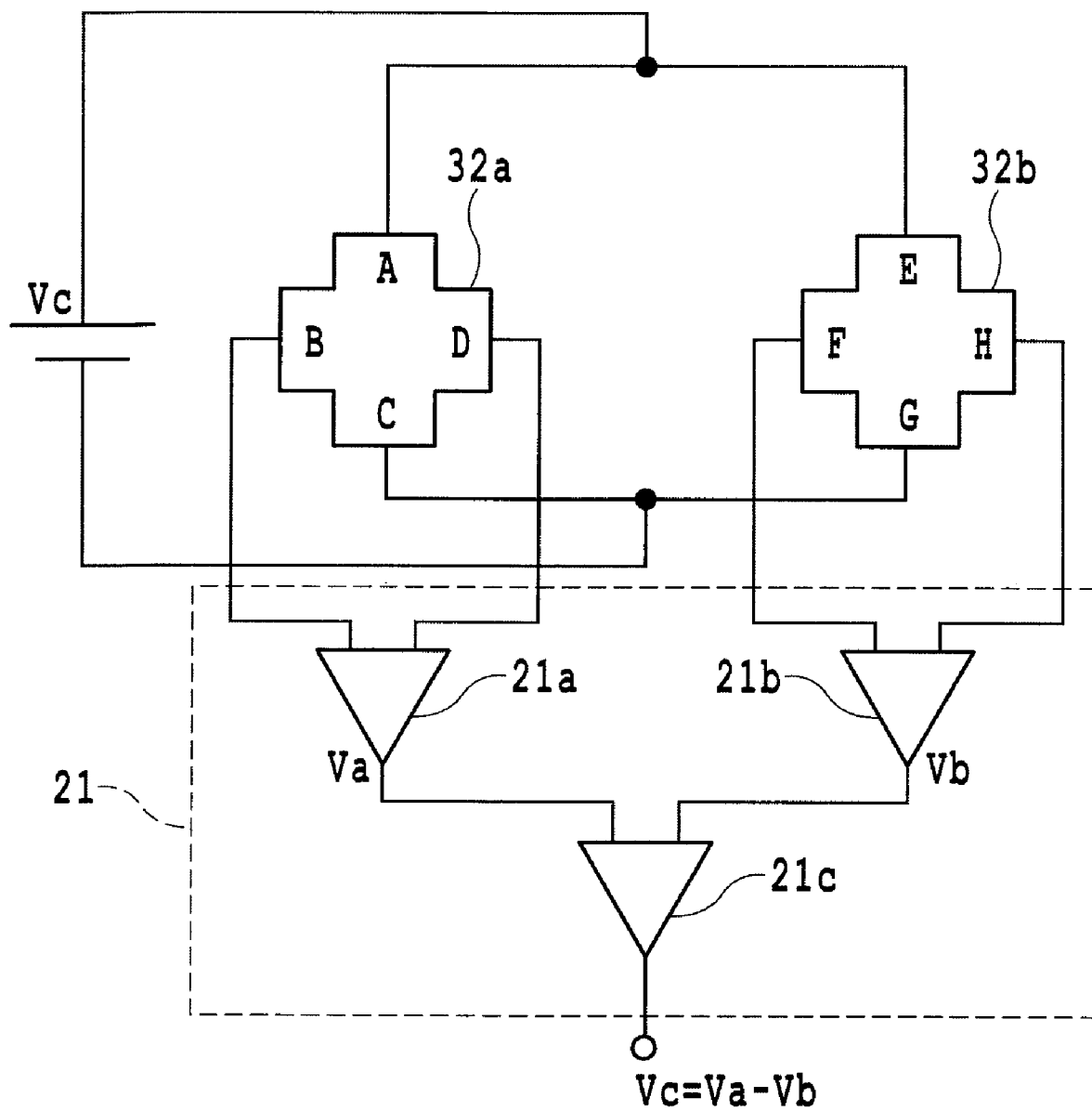
FIG. 2 is a configuration diagram showing a configuration of a detection circuit of the position detection apparatus of FIG. 1.
Figure 3A:
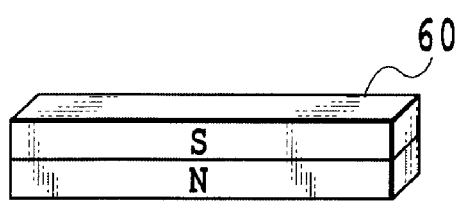
FIG. 3A is an explanatory diagram of a rectangular solid magnet showing an exemplary magnet shape applicable to the present invention.
Figure 3B:
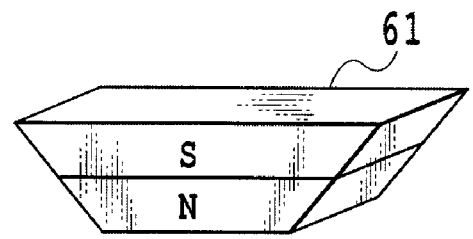
FIG. 3B is an explanatory diagram of a square pole magnet showing an exemplary magnet shape applicable to the present invention.
Figure 3C:
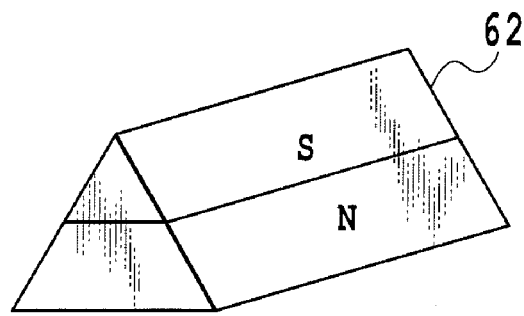
FIG. 3C is an explanatory diagram of a triangle pole magnet showing an exemplary magnet shape applicable to the present invention.
Figure 3D:
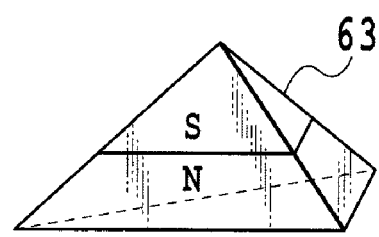
FIG. 3D is an explanatory diagram of a triangular pyramid magnet showing an exemplary magnet shape applicable to the present invention.
Figure 3E:
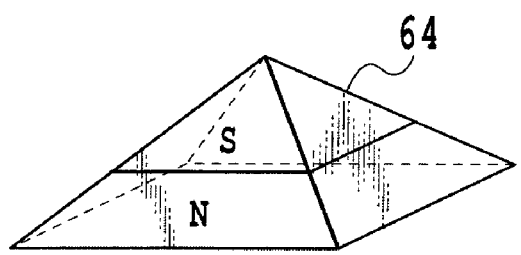
FIG. 3E is an explanatory diagram of a quadrangular pyramid magnet showing an exemplary magnet shape applicable to the present invention.
Figure 3F:
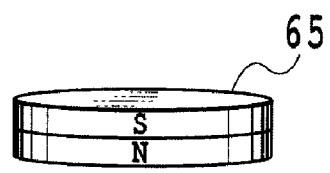
FIG. 3F is an explanatory diagram of an elliptic column magnet showing an exemplary magnet shape applicable to the present invention.

FIG. 2 shows an exemplary circuit configuration of the position detection apparatus 30.

The position detection apparatus 30 includes a driving and processing circuit for the two Hall sensors 32a and 32b.

The first Hall sensor 32a includes a positive pole input terminal A, positive pole output terminal B, negative pole input terminal C and negative pole output terminal D. The second Hall sensor 32b includes a positive pole input terminal E, positive pole output terminal F, negative pole input terminal G and negative pole output terminal H.

The positive pole input terminal A of the first Hall sensor 32a is connected to the positive pole input terminal E of the second Hall sensor 32b. The negative pole input terminal C of the first Hall sensor 32a is connected to the negative pole input terminal G of the second Hall sensor 32b. Thus, the connected terminals are used as input terminals of the drive circuit.

The positive pole output terminal B and negative pole output terminal D of the first Hall sensor 32a are connected to a first differential amplifier 21a of a differential signal processing circuit 21. The positive pole output terminal F and negative pole output terminal H of the second Hall sensor 32b are connected to a second differential amplifier 21b of the differential signal processing circuit 21. An output terminal of the first differential amplifier 21a and an output terminal of the second differential amplifier 21b are connected to an input terminal of a third differential amplifier 21c.

In the driving and processing circuit having the above configuration, an output value Vc as a differential value (Va−Vb) between Hall output voltage Va of the first Hall sensor 32a and Hall output voltage Vb of the second Hall sensor 32b is outputted from an output terminal of the third differential amplifier 21c. The output value from the output terminal of the third differential amplifier 21c corresponds to a position of the rectangular solid magnet 31.

According to this configuration, the input terminals of the first Hall sensor 32a and second Hall sensor 32b are connected in parallel, but the present embodiment is not limited to such parallel connection. Also, it is noted that the differential amplifiers 21a to 21c may be constructed as higher-precision instrumentation amplifiers.

<Angleθ>

Angleθ is an angle between a line 101 that perpendicularly bisects the short side of the rectangular solid magnet 31 and a line 102 connecting the centers of magnetism sensing sections of the two Hall sensors 32a and 32b. Angleθ is defined as an angle smaller than 90 degrees (θ=90°).

In the present example, the rectangular solid magnet 31 moves only in an X-axis direction. Here, "moving in an X-axis direction" means that the rectangular solid magnet 31 moves in a direction parallel to an X-axis direction while setting angle θ between the longitudinal direction of the rectangular solid magnet 31 and a Y-axis direction.

The first Hall sensor 32a and second Hall sensor 32b are arranged on a line (on a Y-axis) orthogonal to movement direction of the rectangular solid magnet 31. Also, arrangement is made so that angle θ between the line 101 that perpendicularly bisects the short side of the rectangular solid magnet 31 and the line 102 connecting the centers of magnetism sensing section of the two Hall sensors 32a and 32b is set to a predetermined angle θ except θ=0 or 90 degrees.

In this case, the following parameters are optimally set such that a differential value of Hall output voltage between the Hall sensors 32a and 32b corresponding to a movement distance of the rectangular solid magnet 31 has linearity sufficient to achieve a resolution required for a desired position detection range. As parameters, for example, the length 34a of the rectangular solid magnet 31 in a long side direction X, the length 34b of the rectangular solid magnet 31 in a short side direction Y, the length 34c of the rectangular solid magnet 31 in a thickness direction Z (the length of the magnet in a magnetization direction), the distance 35a from the plane 100 of the rectangular solid magnet 31 opposite to the substrate 33 having the Hall sensors 32a and 32b to the center of magnetism sensing section of the Hall sensors 32a and 32b, the distance 35b between the center of magnetism sensing section of the Hall sensor 32a and the center of magnetism sensing section of the Hall sensor 32b, and the angle θ between the line 101 that perpendicularly bisects the short side of the rectangular solid magnet 31 and the line 102 connecting the centers of magnetism sensing section of the two Hall sensors 32a and 32b are described.

Accordingly, even when general-purpose parts are used as constituent components of the position detection apparatus 30, miniaturization can be achieved with a simple circuit configuration, compared to the conventional position detection apparatus. Further, a distance can be detected in a wide range with high-precision. Specific optimal values of the above parameters will be described as following examples.

The constituent components of the position detection apparatus 30 may have the following configuration other than the above described one.

FIGS. 3A to 3F shows variations of the rectangular solid magnet.

There can be used magnets of various shapes including rectangular solid (cube) 60, polygonal pole such as square pole 61 or triangular pole 62, polygonal pyramid such as triangular pyramid 63 or quadrangular pyramid 64, and cylindrical column (elliptic column) 65.

The Hall sensor can be used various type of Hall sensors, such as a Hall sensor that does not include a magnetic chip for magnetic amplification, a Hall sensor composed of III-V family chemical compound semiconductor such as GaAs, InAs or InSb, or a Hall sensor composed of IV family semiconductor such as Si or Ge. Of course, a Hall sensor structured by combining the above materials can also be used.

The Hall sensors can be put integrally into a single package.

Embodiment

An embodiment of the position detection apparatus 30 will be described.

A case where a position is detected within a range of 8 mm (±4 mm) at a resolution of 30 µm in a wide temperature range is described. An example of designing optimal values of parameters of each constituent component in FIG. 1 is described.

It is assumed that the length 34a of the rectangular solid magnet 31 in a long side direction X is 9.7 mm. The length 34b of the rectangular solid magnet 31 in a short side direction Y is 1.4 mm. The length 34c of the rectangular solid magnet 31 in a thickness direction Z (the length of the magnet in a magnetization direction) is 1.0 mm.

Also, it is assumed that the distance 35a from the plane 100 of the rectangular solid magnet 31 opposite to the Hall sensors 32a and 32b to the center of magnetism sensing section of the Hall sensors 32a and 32b is 0.5 mm. The distance 35b between the center of magnetism sensing section of the Hall sensor 32a and the center of magnetism sensing section of the Hall sensor 32b is 0.8 mm. The angle θ between the line 101 that perpendicularly bisects the short side of the rectangular solid magnet 31 and the line 102 connecting the centers of magnetism sensing sections of the two Hall sensors 32a and 32b is 86 degrees (θ=86°).

In the above design, an arrangement error of the Hall sensors 32a and 32b can be reduced in a design that the Hall sensors 32a and 32b are structured as a single package compared to a design that the Hall sensors 32a and 32b are separately mounted on the substrate. Thus, high precision can be achieved in the position detection apparatus. Further, for example, all pairs of Hall sensors 32a and 32b can be arranged on a Si substrate.

Accordingly, the Hall sensors 32a and 32b are incorporated into a single package preferably.

Figure 4A:
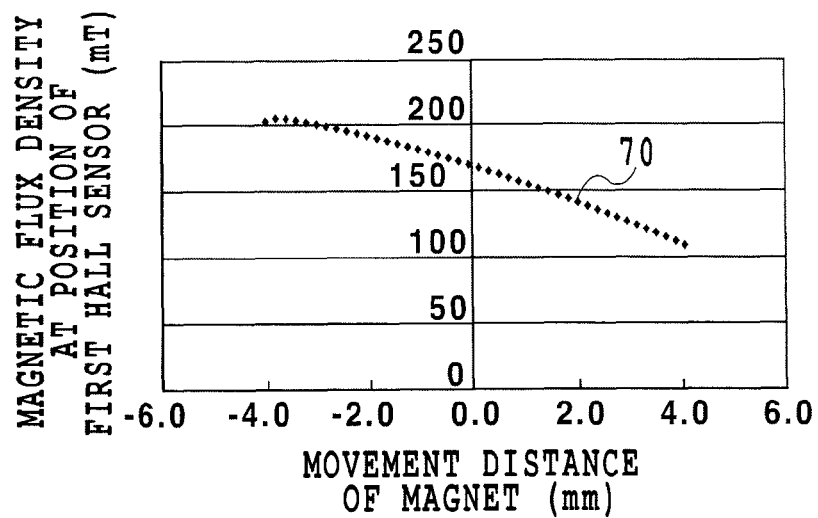
FIG. 4A is an explanatory diagram showing a variation in magnetic flux density at a position of a first Hall sensor 32a to the movement distance of a magnet.
Figure 4B:
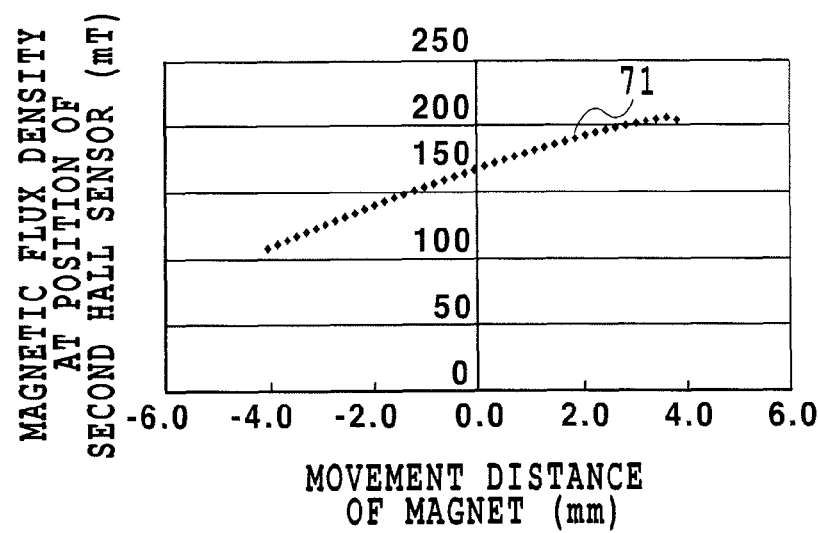
FIG. 4B is an explanatory diagram showing a variation in magnetic flux density at a position of a second Hall sensor 32b to the movement distance of a magnet.
Figure 4C:
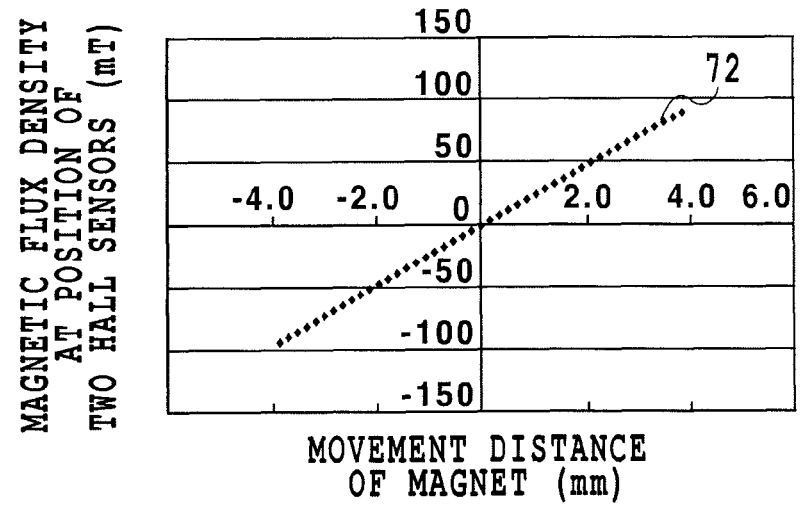
FIG. 4C is an explanatory diagram showing a variation in differential magnetic flux density obtained by subtracting a magnetic flux density at a position of a first Hall sensor 32a from a magnetic flux density at a position of a second Hall sensor 32b to the movement distance of a magnet.

FIGS. 4A to 4C show a variation in magnetic flux density to a movement distance of the rectangular solid magnet 31.

FIG. 4A shows a variation 70 of magnetic flux density at a position of the first Hall sensor 32a to a movement distance of a magnet. FIG. 4B shows a variation 71 of magnetic flux density at a position of the second Hall sensor 32b to a movement distance of a magnet. FIG. 4C shows a variation 72 in differential magnetic flux density obtained by subtracting a magnetic flux density at the position of the first Hall sensor 32a from a magnetic flux density at the position of the second Hall sensor 32b to a movement distance of a magnet.

Thus, the differential magnetic flux density calculated by subtracting a magnetic flux density at the position of the first Hall sensor 32a from a magnetic flux density at the position of the second Hall sensor 32b to a movement distance of a magnet can be varied almost linearly.

The Hall output voltage is proportional to the magnitude of magnetic flux density. The differential value between output voltage Va of the first Hall sensor 32a and output voltage Vb of the second Hall sensor 32b nearly has a linear output characteristic to the a movement distance of a magnet.

Figure 5A:
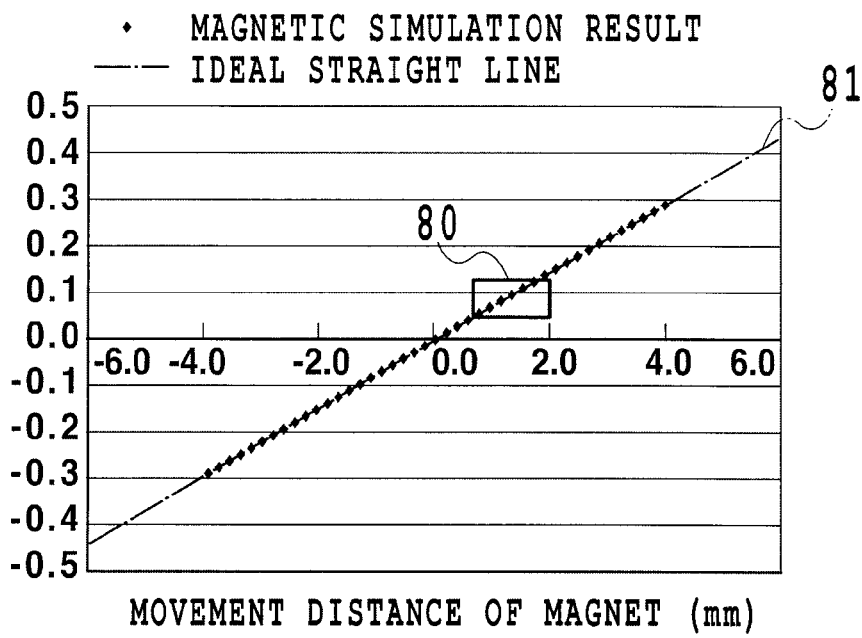
FIG. 5A is an explanatory diagram showing a result of calculating based on magnetic simulation, a value (a ratio between a difference and sum of output voltages) obtained by dividing a differential value of Hall output voltages between Hall sensors by a sum of Hall output voltages to the movement distance of a rectangular solid magnet when parameters are optimized using the position detection apparatus of FIG. 1.
Figure 5B:
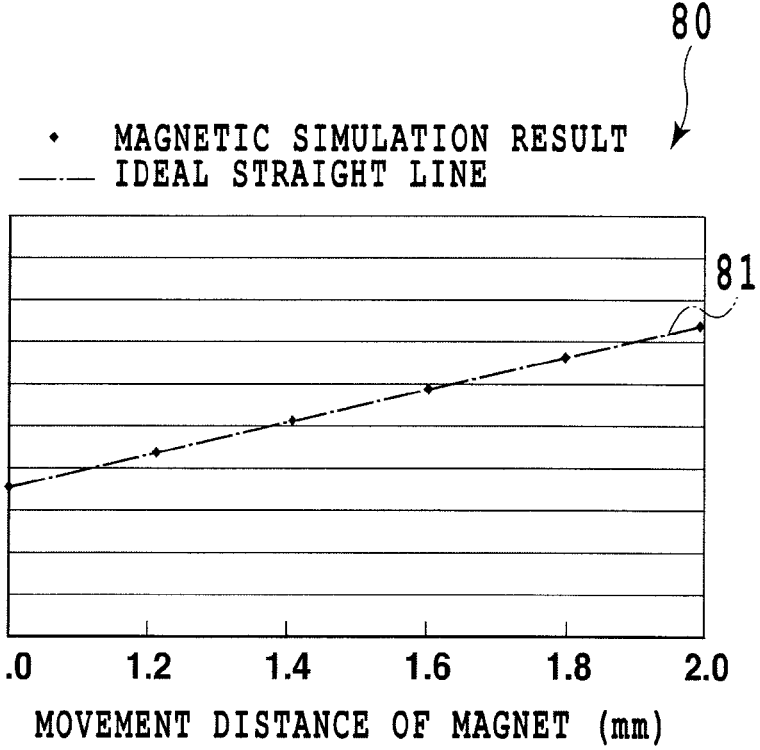
FIG. 5B is an enlarged view of FIG. 5A showing a result of calculating based on magnetic simulation, a value (a ratio between a difference and sum of output voltages) obtained by dividing a differential value of output voltage between Hall sensors by a sum of output voltages to the movement distance of a rectangular solid magnet when parameters are optimized using the position detection apparatus of FIG. 1.

FIGS. 5A and 5B show a result of magnetic simulation, a value (ratio between a difference and sum of Hall output voltages) calculated by dividing a differential value (Va−Vb) between Hall output voltage Va of the Hall sensor 32a and Hall output voltage Vb of the Hall sensor 32b by a sum (Va+Vb) of the output voltages to movement of the rectangular solid magnet 31. FIG. 5B is an enlarged view of an area 80 of FIG. 5A. Reference character 81 denotes an ideal straight line.

As a premise of magnetic simulation, the sensitivity of the two Hall sensors 32a and 32b is set to 2.4 mV/mT (a typical Hall sensor sensitivity) and residual magnetic flux density Br of the rectangular solid magnet 31 is set to 1200 mT (a typical neodymium sintered magnet value).

From the result of magnetic simulation shown in FIGS. 5A and 5B, the position detection apparatus 30 according to the present invention is used. Thus, the value (ratio between a difference and sum of the output voltages) that calculated by dividing a differential value between Hall output voltage Va of the Hall sensor 32a and Hall output voltage Vb of the Hall sensor 32b by a sum of the output voltages to movement of the rectangular solid magnet 31 can have high linearity and matches well with an ideal straight line.

In FIG. 5A, the ideal straight line 81 is a line produced by connecting a value (ratio between a difference and sum of Hall output voltages) that calculated by dividing a differential value (Va−Vb) between Hall output voltages of the two Hall sensors 32a and 32b by a sum (Va+Vb) of the Hall output voltages when the movement distance of the rectangular solid magnet 31 is +4 mm, with a value (ratio between a difference and sum of Hall output voltages) that calculated by dividing a differential value (Va−Vb) between Hall output voltages of the two Hall sensors 32a and 32b by a sum (Va+Vb) of the Hall output voltages when the movement distance of the rectangular solid magnet 31 is −4 mm.

In FIG. 5B, the value (ratio between a difference and sum of the Hall output voltages) that calculated by dividing a differential value (Va−Vb) between Hall output voltage Va of the first Hall sensor 32a and Hall output voltage Vb of the second Hall sensor 32b by a sum (Va+Vb) of the output voltages is a little different from the ideal straight line.

Generally, a position is detected by using the value of the ideal straight line. Accordingly, when the difference between the value of the ideal straight line 81 and the value (ratio between a difference and sum of the Hall output voltages) that calculated by dividing a differential value (Va−Vb) between Hall output voltage Va of the first Hall sensor 32a and Hall output voltage Vb of the second Hall sensor 32b by a sum (Va+Vb) of the Hall output voltages is large, the error of position detection becomes large.

Figure 6:
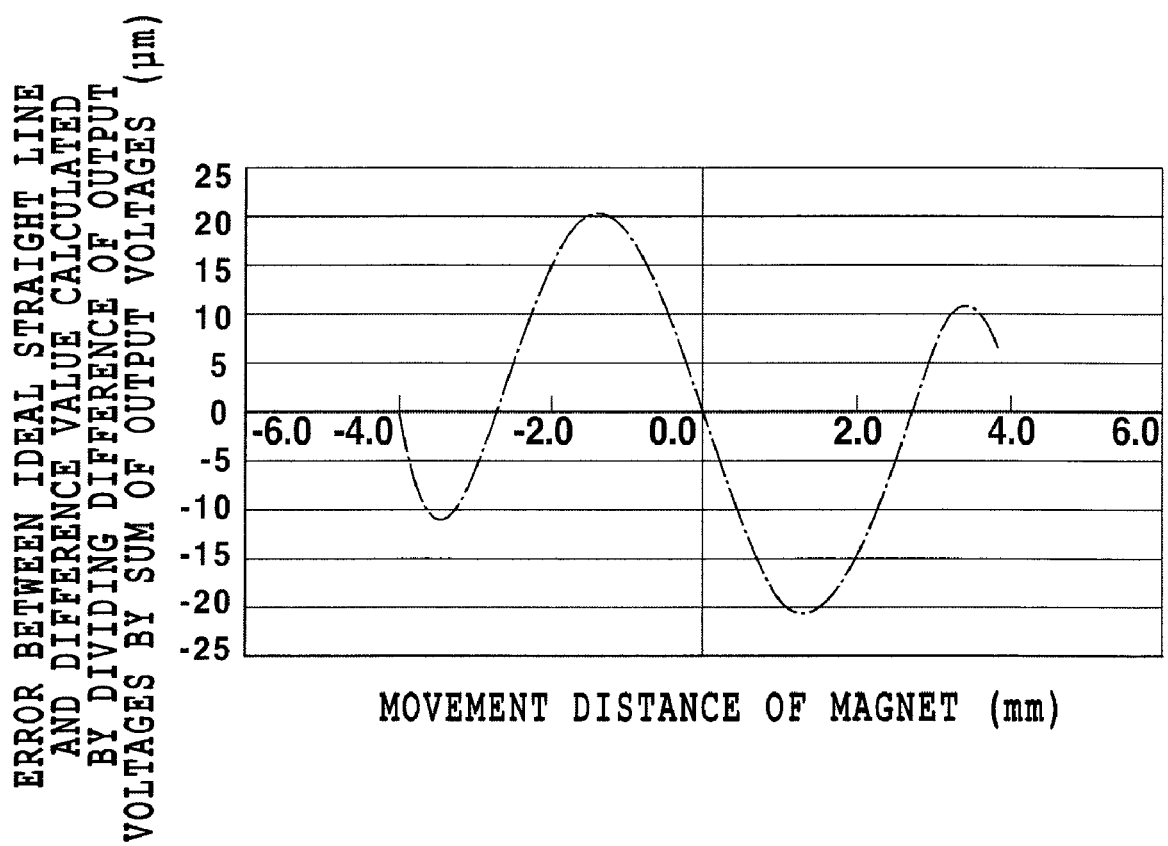
FIG. 6 is an explanatory diagram showing an error in position detection to the movement distance of a rectangular solid magnet, calculated based on a difference value between an ideal straight line and the magnetic simulation result shown in FIG. 5A.

FIG. 6 is a view showing an error of position detection calculated by the difference between the ideal straight line 81 and the result of simulation shown in FIGS. 5A and 5B. In this case, a line produced by connecting a value (ratio between a difference and sum of Hall output voltages) that calculated by dividing a differential value between Hall output voltages of the two Hall sensors 32a and 32b by a sum of the output voltages when the movement distance of the rectangular solid magnet 31 is +4 mm, with a value (ratio between a difference and sum of Hall output voltages) that calculated by dividing a differential value between Hall output voltages of the two Hall sensors 32a and 32b by a sum of the hall output voltages when the movement distance of the rectangular solid magnet 31 is −4 mm, is set to the ideal straight line 81.

As shown in FIG. 6, an error of position detection is about 20 μm at maximum, and a value of resolution is 0.375% to a full stroke of 8 mm. Thus, a position can be detected with high-precision.

Naturally, from the result of shown in FIGS. 5A and 5B, a line calculated by least-square method may be set to the ideal straight line 81. When a line calculated by least-square method is set to the ideal straight line 81, the error of position detection is further reduced. Thus, high resolution can be obtained.

In this way, when the position detection apparatus 30 according to the present invention is used, a small-sized position detection apparatus can be constructed compared to position detection apparatuses described in the following comparative examples.

COMPARATIVE EXAMPLE

A comparative example is described using the conventional art, similarly to the above described example.

A position is detected with a range of 8 mm (±4 mm) at a resolution of 30 μm in a wide temperature range.

FIGS. 7A and 7B show a schematic configuration of a conventional position detection apparatus using a magnet and Hall sensors.

Reference numeral 41 denotes a rectangular solid magnet magnetized in a direction orthogonal to a plane 200 opposite to Hall sensors. Reference numerals 42a and 42b denote Hall sensors. Reference numeral 43 denotes a substrate having the Hall sensors 42a and 42b. Reference numeral 44a denotes a length of the rectangular solid magnet 41 in a long side direction X. Reference numeral 44b denotes a length of the rectangular solid magnet 41 in a short side direction Y. Reference numeral 44c denotes a length of the rectangular solid magnet 41 in a thickness direction Z (a length of the magnet in a magnetization direction). Reference numeral 45a denotes a distance from the plane 200 of the rectangular solid magnet 41 opposite to the Hall sensors 42a and 42b to the center of magnetism sensing section of the Hall sensors 42a and 42b. Reference numeral 45b denotes a distance between the center of magnetism sensing section of the Hall sensor 42a and the center of magnetism sensing section of the Hall sensor 42b.

In the present comparative example, the rectangular solid magnet 41 moves only in an X-axis direction shown in the Figures. The Hall sensors 42a and 42b are arranged in a horizontal plane to movement direction of the rectangular solid magnet 41.

In this case, when position detection equivalent to the above described example of FIG. 1 is performed, the length 44a of the rectangular solid magnet 41 in a long side direction X is 15.2 mm. The length 44b of the rectangular solid magnet 41 in a short side direction Y is 15.0 mm. The length 44c of the rectangular solid magnet 41 in a thickness direction Z (the length of the magnet in a magnetization direction) is 4.3 mm. The distance 45a from the plane of the rectangular solid magnet 41 opposite to the Hall sensors to the magnetism sensing section of the Hall sensors is 6.0 mm. The distance 45b between the center of magnetism sensing section of the Hall sensor 42a and the center of magnetism sensing section of the Hall sensor 42b is 11.3 mm.

Figure 8A:
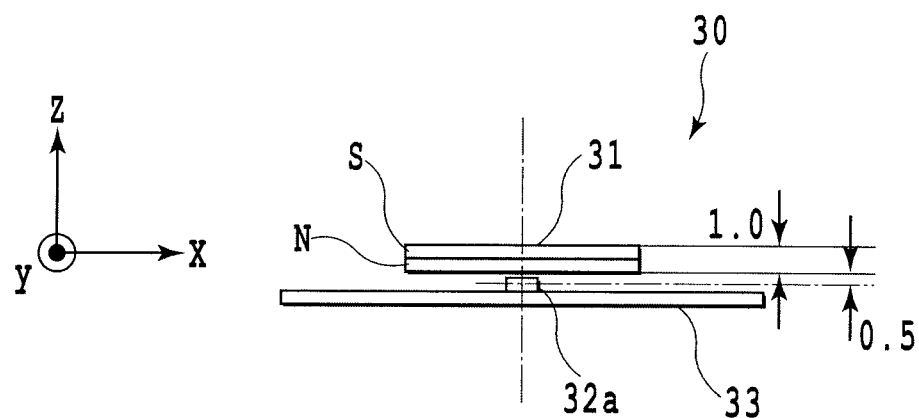
FIG. 8A is a cross-sectional view showing a schematic configuration of the position detection apparatus of FIG. 1A as same magnification for comparison with conventional position detection apparatus.
Figure 8B:
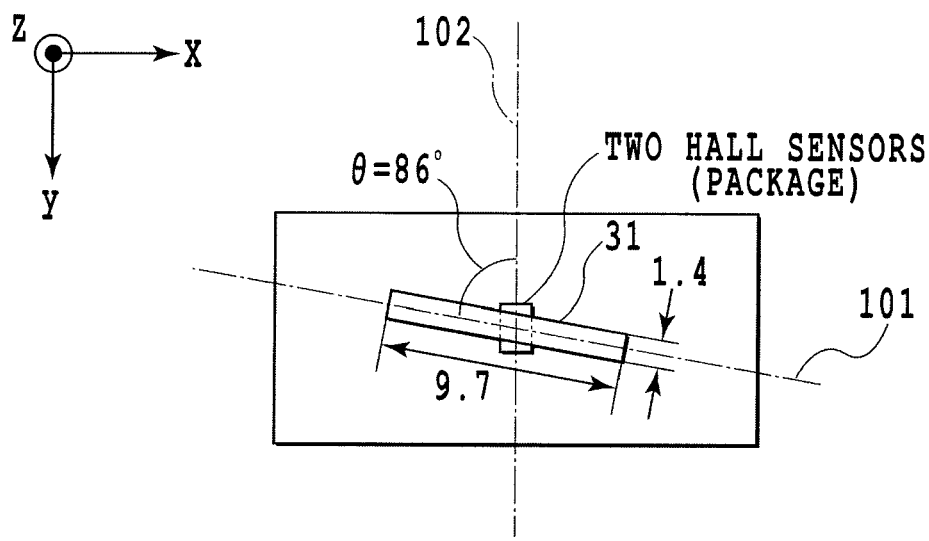
FIG. 8B is a top view showing a schematic configuration of the position detection apparatus of FIG. 1B for as same magnification comparison with conventional position detection apparatus.

Here, the configuration of the position detection apparatus 30 of the above described example of FIG. 1 is shown as a view at the same magnification in FIGS. 8A and 8B. The configuration of the conventional example for comparison with the present invention is shown as the same magnification in FIGS. 9A and 9B.

Figure 9A:
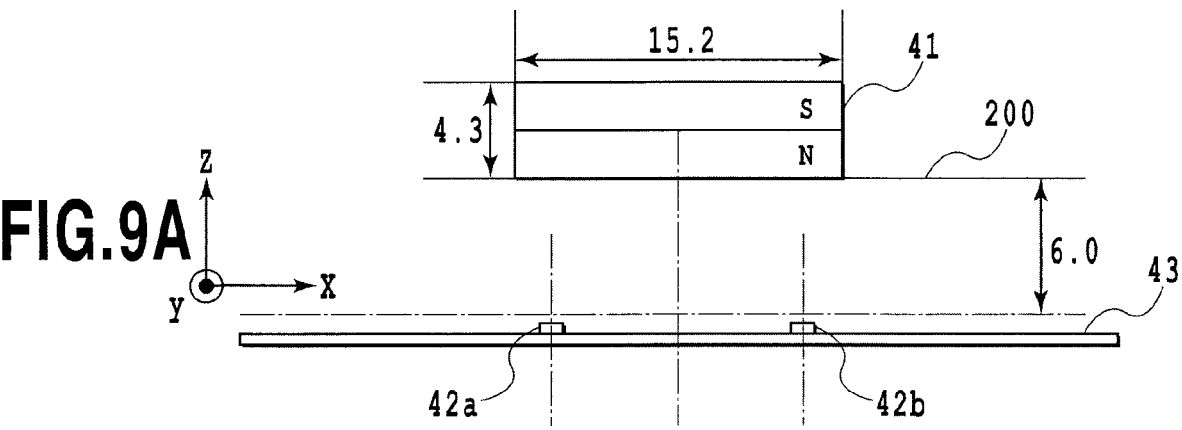
FIG. 9A is a cross-sectional view showing the configuration of the conventional position detection apparatus of FIG. 7A as same magnification.
Figure 9B:
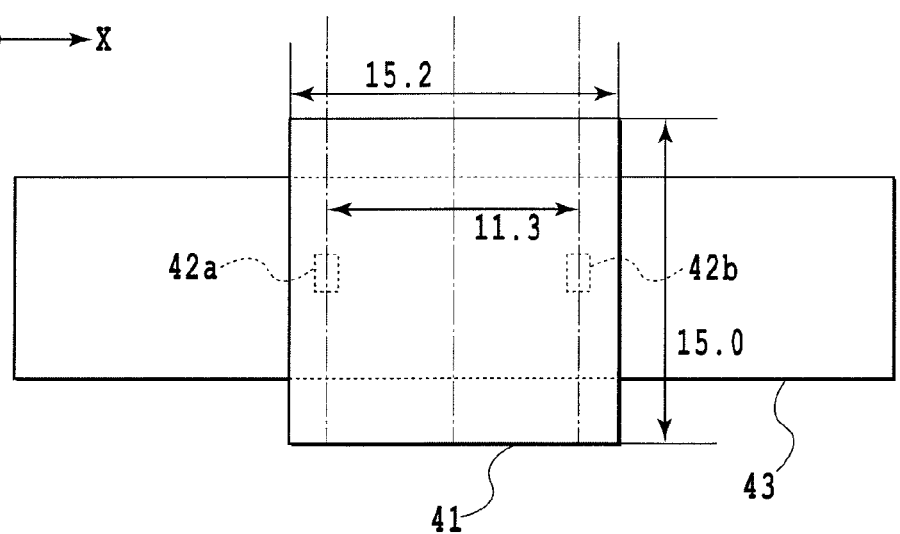
FIG. 9B is a top view showing the configuration of the conventional position detection apparatus of FIG. 7B as same magnification.

From these, the configuration of the position detection apparatus 30 according to the present invention of FIGS. 8A and 8B has an advantageous effect that the size and thickness of position detection apparatus can be significantly reduced, compared to the configuration of the conventional example of FIGS. 9A and 9B for comparison.

Second Example

A second embodiment of the present invention will be described with reference to FIGS. 10 and 11. Here, the same reference characters are applied to parts corresponding to the above described first example, and an explanation thereof is omitted.

Multiple pairs of two Hall sensors may be combined in the position detection apparatus 30 of the above example of FIG. 1.

<Configuration>

In this example, there will be described an exemplary specific configuration of a position detection apparatus that multiple pairs of Hall sensors are included and the size of magnet is reduced.

Similarly to the above described first example, a case where a position is detected with a range of 8 mm (±4 mm) at a resolution of 30 μm in a wide temperature range is described.

FIGS. 11A and 10B show an exemplary configuration of a position detection apparatus 50 using a magnet and Hall sensors according to the present invention.

Reference numeral 51 denotes a rectangular solid magnet magnetized in a direction orthogonal to a plane 100 opposite to Hall sensors 52a, 52b, 52c and 52d. Reference numeral 52a denotes a first Hall sensor. Reference numeral 52b denotes a second Hall sensor. Reference numeral 52c denotes a third Hall sensor. Reference numeral 52d denotes a fourth Hall sensor.

Reference numeral 53 denotes a substrate having one pair of Hall sensors 52a and 52b and the other pair of Hall sensors 52c and 52d.

Reference numeral 54a denotes a length of the rectangular solid magnet 51 in a long side direction X.

Reference numeral 54b denotes a length of the rectangular solid magnet 51 in a short side direction Y. Reference numeral 54c denotes a length of the rectangular solid magnet 51 in a thickness direction Z (a length of the magnet in a magnetization direction).

Reference numeral 55a denotes a distance from the plane 100 of the rectangular solid magnet 51 opposite to the Hall sensors 52a, 52b, 52c and 52d to the center of magnetism sensing section of the Hall sensors 52a, 52b, 52c and 52d.

Reference numeral 55b denotes a distance of a line 111 connecting the center of magnetism sensing section of the Hall sensor 52a in the one pair with the center of magnetism sensing section of the Hall sensor 52b. Reference numeral 55b denotes a distance of a line 112 connecting the center of magnetism sensing section of the Hall sensor 52c in the other pair with the center of magnetism sensing section of the Hall sensor 52d.

Figure 11:
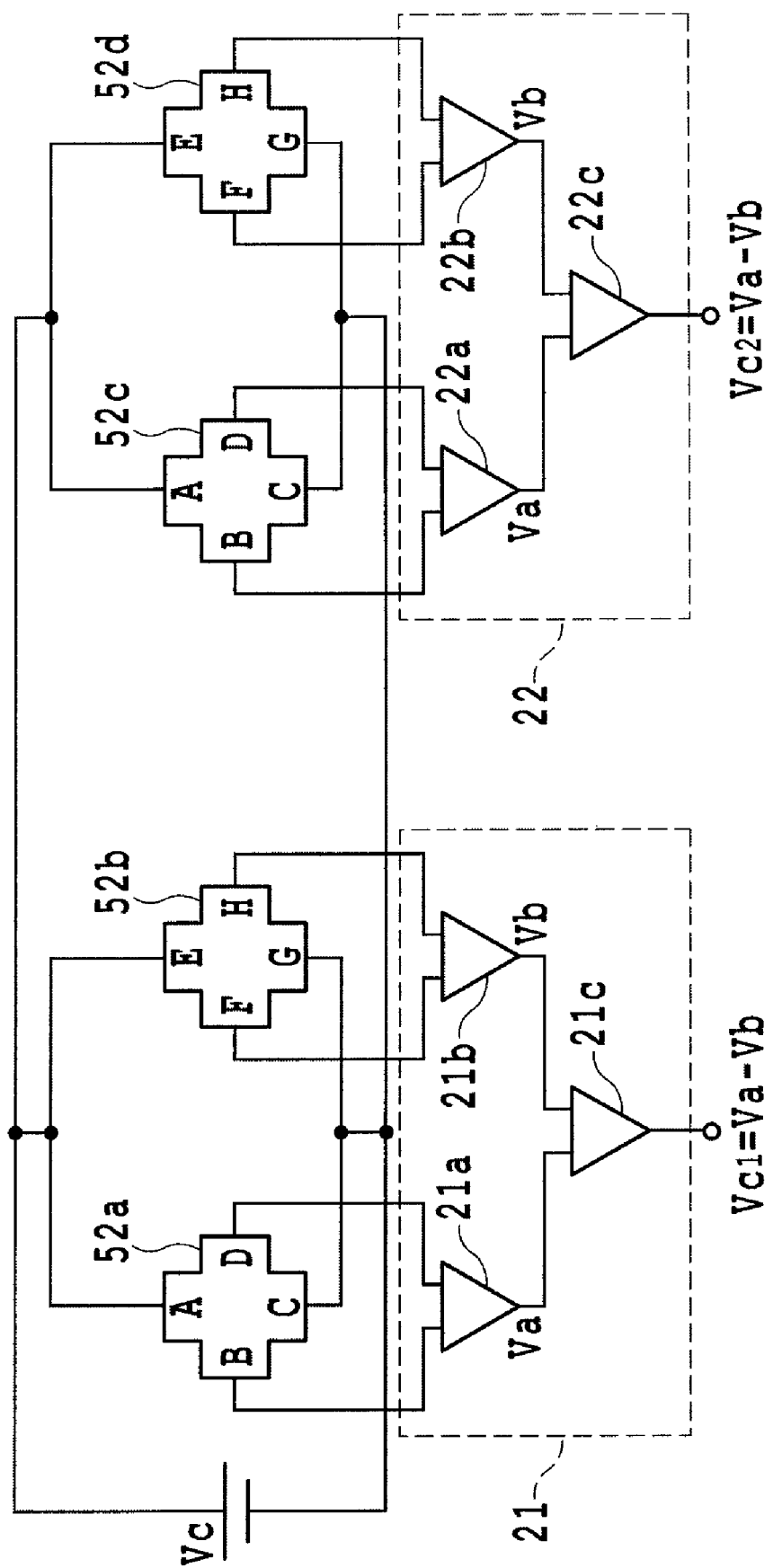
FIG. 11 is a configuration diagram showing a configuration of a detection circuit of the position detection apparatus of FIGS. 10A and 10B.
Figure 13:
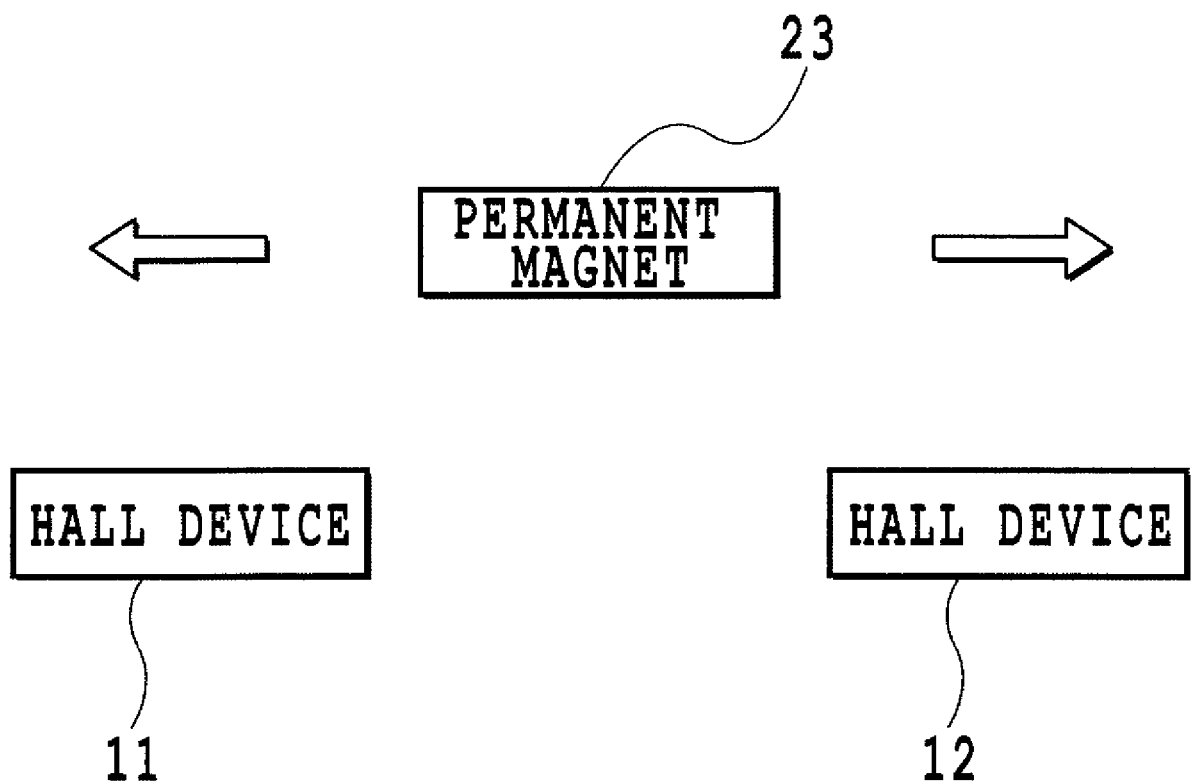
FIG. 13 is an explanatory diagram showing a conventional position detection method using Hall sensors.

FIG. 11 shows an exemplary circuit configuration of the position detection apparatus 50.

The positive pole output terminal B and negative pole output terminal D of the first Hall sensor 52a are connected to a first differential amplifier 21a of a differential signal processing circuit 21. The positive pole output terminal F and negative pole output terminal H of the second Hall sensor 52b are connected to a second differential amplifier 21b of the differential signal processing circuit 21. Output signals of the first differential amplifier 21a and second differential amplifier 21b are connected to a third differential amplifier 21c.

The positive pole output terminal B and negative pole output terminal D of the third Hall sensor 52a are connected to a first differential amplifier 22a of a differential signal processing circuit 22. The positive pole output terminal F and negative pole output terminal H of the second Hall sensor 52d are connected to a second differential amplifier 22b of the differential signal processing circuit 22. Output signals of the first differential amplifier 22a and second differential amplifier 22b are sent to a third differential amplifier 22c.

<Operation>

As shown in FIG. 11, a position is detected with a range of 4 mm in the range of 8 mm using a signal outputted from the differential signal processing circuit 21 connected to the first Hall sensor 52a and second Hall sensor 52b. A position is detected with another range of 4 mm using a signal outputted from the differential signal processing circuit 22 connected to the third Hall sensor 52c and fourth Hall sensor 52d.

In the driving and processing circuit of FIG. 11, output value Vc1 as a differential value (Va−Vb) between a Hall output voltage of the first Hall sensor 52a and a Hall output voltage of the second Hall sensor 52b is outputted from the output terminal of the third differential amplifier 21c. Output value Vc2 as a differential value (Va−Vb) between a Hall output voltage of the third Hall sensor 52c and a Hall output voltage of the fourth Hall sensor 52d is outputted from the output terminal of the third differential amplifier 22c. The output values outputted from the output terminals correspond to a position of the rectangular solid magnet 51 respectively.

In the present example, the rectangular solid magnet 51 moves only in an X-axis direction. Here, "moves only in an X-axis direction" means that, similarly to the above described first example, the rectangular solid magnet 51 moves in a direction parallel to an X-axis direction while maintaining angle θ to a Y-axis direction.

The Hall sensors 52a and 52b are arranged on a line orthogonal to movement direction of the rectangular solid magnet 51. The Hall sensors 52c and 52d are arranged on the line 112 that is parallel to the line 111 and is distant 4 mm from the line 111. The line 111 is connected to the center of magnetism sensing section of the Hall sensor 52a and the center of magnetism sensing section of the Hall sensor 52b.

In the above arrangement, a position is detected with a range of 4 mm in the position detection range of 8 mm using the Hall sensors 52a and 52b. A position is detected with another range of 4 mm using the Hall sensors 52c and 52d.

In the above arrangement, as a result of the magnetic simulation, position detection equivalent to the above described first example of FIG. 1 is described. The length 54a of the rectangular solid magnet 51 in a long side direction X is 5.0 mm. The length 54b of the rectangular solid magnet 51 in a short side direction Y is 1.4 mm. The length 54c of the rectangular solid magnet 51 in a thickness direction Z (the length of the magnet in a magnetization direction) is 1.0 mm. The distance 55a from the plane 100 of the rectangular solid magnet 51 opposite to the Hall sensors 52a, 52b, 52c and 52d to the center of magnetism sensing section of the Hall sensors 52a, 52b, 52c and 52d is 0.5 mm. The distance 55b between the center of magnetism sensing section of the Hall sensor 52*a* and the center of magnetism sensing section of the Hall sensor 52*b* is 0.8 mm.

In the above described first example of FIG. 1, the length of the rectangular solid magnet 31 in a long side direction X is 9.7 mm. In the present example, the length is 5.0 mm and thus the length can be reduced by half.

That is, in a case where the number of magnetic sensors (Hall sensors 52*a*, 52*b*, 52*c* and 52*d*) is increased but the position detection apparatus must be further miniaturized, it is confirmed that it is more effective in that increasing the number of magnetic sensors (Hall sensors 52*a*, 52*b*, 52*c* and 52*d*) is selected.

In the present example, two pairs of Hall sensors (Hall sensors 52*a*, 52*b*, 52*c* and 52*d*), i.e., four Hall sensors are described. However, when the number of Hall sensors is increased by 2n (n is the number of pairs and is an integral number equal or larger than 1), the position detection apparatus can be further miniaturized.

Third Example

A third embodiment of the present invention will be described with reference to FIG. 12. Here, the same reference characters are applied to parts corresponding to the above described examples, and an explanation thereof is omitted.

The present example is a variation of the position detection apparatus 30 of the above described first example of FIG. 1.

In the position detection apparatus 30 of FIG. 1, the length 34*b* of the rectangular solid magnet 31 in a short side direction Y is set to 1.4 mm. The length 34*c* of the rectangular solid magnet 31 in a thickness direction Z (the length of the magnet in a magnetization direction) is set to 1.0 mm. The distance 35*a* from the plane 100 of the rectangular solid magnet 31 opposite to the Hall sensors 32*a* and 32*b* to the center of magnetism sensing section of the Hall sensors 32*a* and 32*b* is set to 0.5 mm. The distance 35*b* between the center of magnetism sensing section of the Hall sensor 32*a* and the center of magnetism sensing section of the Hall sensor 32*b* is set to 0.8 mm. The angle θ between the line 101 that perpendicularly bisects the short side of the rectangular solid magnet 31 and the line 102 connecting the centers of magnetism sensing section of the two Hall sensors 32*a* and 32*b* is set to 86 degrees (θ=86°).

In the present example, in order to achieve a resolution of about 0.5% to the full stroke of position detection, the length 34*a* of the rectangular solid magnet 31 in a long side direction X was examined using a magnetic simulation. When the desired position detection range is 10 mm, the length 34*a* of the rectangular solid magnet 31 in a long side direction X is 10.8 mm.

Also, when the desired position detection range is 9 mm, the length 34*a* of the rectangular solid magnet 31 in a long side direction X is 10.1 mm.

Also, when the desired position detection range is 8 mm, the length 34*a* of the rectangular solid magnet 31 in a long side direction X is 9.3 mm.

Also, when the desired position detection range is 7 mm, the length 34*a* of the rectangular solid magnet 31 in a long side direction X is 8.6 mm.

Also, when the desired position detection range is 6 mm, the length 34*a* of the rectangular solid magnet 31 in a long side direction X is 7.9 mm.

Also, when the desired position detection range is 5 mm, the length 34*a* of the rectangular solid magnet 31 in a long side direction X is 7.1 mm.

Also, when the desired position detection range is 4 mm, the length 34*a* of the rectangular solid magnet 31 in a long side direction X is 6.5 mm.

Also, when the desired position detection range is 3 mm, the length 34*a* of the rectangular solid magnet 31 in a long side direction X is 5.8 mm.

Also, when the desired position detection range is 2 mm, the length 34*a* of the rectangular solid magnet 31 in a long side direction X is 5.2 mm.

FIG. 12 is a table showing a variation in the length 34*a* of the rectangular solid magnet 31 in a long side direction X when the desired range of position detection is varied at a pitch of 1 mm with a range from 2 mm to 10 mm.

In this case, the parameters except the length 34*a* of the rectangular solid magnet 31 in a long side direction X are set to the above described values.

In this example, when the desired range of position detection is larger, the length of the rectangular solid magnet 31 in a long side direction X is set to be longer in effect.

Also, as described the present example, when the ratio of length between short side direction Y and long side direction X of the rectangular solid magnet 31 is set to Y=1: X=3.5 or more, preferably to a range from 3.5 or more to 8.0 or less, the present invention can be appropriately applied to a configuration using various types of constituent components. In this case, the value of ratio between short side direction Y and long side direction X of the rectangular solid magnet 31 is calculated by using the numerical values of FIG. 12. Of course, when the desired position detection range is larger than 10 mm, the ratio between short side direction Y and long side direction X of the rectangular solid magnet 31 can be set larger than Y=1: X=8.

Fourth Example

A fourth embodiment of the present invention will be described. Here, the same reference characters are applied to parts corresponding to the above described examples, and an explanation thereof is omitted.

There will be described a case where a position is detected with a range of 8 mm (±4 mm) at a resolution of 40 µm in a wide temperature range. An example of designing parameters of the constituent components of FIGS. 1A and 1B is described.

In the above position detection, the length 34*a* of the rectangular solid magnet 31 in a long side direction X is set to 10.9 mm. The length 34*b* of the rectangular solid magnet 31 in a short side direction Y is set to 1.7 mm. The length 34*c* of the rectangular solid magnet 31 in a thickness direction Z (the length of the magnet in a magnetization direction) is set to 2.0 mm. The distance 35*a* from the plane 100 of the rectangular solid magnet 3 opposite to the Hall sensors 32*a* and 32*b* to the center of magnetism sensing section of the Hall sensors 32*a* and 32*b* is set to 1.0 mm. The distance 35*b* between the center of magnetism sensing section of the Hall sensor 32*a* and the center of magnetism sensing section of the Hall sensor 32*b* is set to 0.8 mm. The angle θ between the line 101 that perpendicularly bisects the short side of the rectangular solid magnet 31 and the line 102 connecting the centers of magnetism sensing section of the two Hall sensors 32*a* and 32*b* is set to 67 degrees (θ=67°).

Fifth Example

A fifth embodiment of the present invention will be described. Here, the same reference characters are applied to parts corresponding to the above described examples, and an explanation thereof is omitted.

There will be described another example of designing parameters of the constituent components of FIGS. 1A and 1B. In this case, a position is detected with a range of 8 mm (±4 mm) at a resolution of 40 μm similarly to the fourth example.

In order to perform the above position detection, the parameters may be set as follows. The length 34a of the rectangular solid magnet 31 in a long side direction X is set to 9.5 mm. The length 34b of the rectangular solid magnet 31 in a short side direction Y is set to 1.0 mm. The length 34c of the rectangular solid magnet 31 in a thickness direction Z (the length of the magnet in a magnetization direction) is set to 2.0 mm. The distance 35a from the plane 100 of the rectangular solid magnet 3 opposite to the Hall sensors 32a and 32b to the center of magnetism sensing section of the Hall sensors 32a and 32b is set to 0.5 mm. The distance 35b between the center of magnetism sensing section of the Hall sensor 32a and the center of magnetism sensing section of the Hall sensor 32b is set to 0.8 mm. The angle θ between the line 101 that perpendicularly bisects the short side of the rectangular solid magnet 31 and the line 102 connecting the centers of magnetism sensing section of the two Hall sensors 32a and 32b is set to 89.3 degrees (θ=89.3°).

As described fourth and fifth examples, even when the angle θ between the line 101 that perpendicularly bisects the short side of the rectangular solid magnet 31 and the line 102 connecting the centers of magnetism sensing section of the two Hall sensors 32a and 32b is varied, the size and the arrangement of the rectangular solid magnet 31 are varied. Thus, a position can be detected with a high precision (a precision of 0.5% to the position detection range) in a wide range of 8 mm.

Sixth Example

A sixth embodiment of the present invention will be described. Here, the same reference characters are applied to parts corresponding to the above described examples, and an explanation thereof is omitted.

Another example of designing parameters of the constituent components of FIGS. 1A and 1B is described. A position is detected with a range of 8 mm (±4 mm) at a resolution of 40 μm similarly to the fourth and fifth examples.

In the above position detection, the parameters may be set as follows. The length 34a of the rectangular solid magnet 31 in a long side direction X is set to 11.0 mm. The length 34b of the rectangular solid magnet 31 in a short side direction Y is set to 4.0 mm. The length 34c of the rectangular solid magnet 31 in a thickness direction Z (the length of the magnet in a magnetization direction) is set to 2.8 mm. The distance 35a from the plane 100 of the rectangular solid magnet 3 opposite to the Hall sensors 32a and 32b to the center of magnetism sensing section of the Hall sensors 32a and 32b is set to 3.0 mm. The distance 35b between the center of magnetism sensing section of the Hall sensor 32a and the center of magnetism sensing section of the Hall sensor 32b is set to 3.7 mm. The angle θ between the line 101 that perpendicularly bisects the short side of the rectangular solid magnet 31 and the line 102 connecting the centers of magnetism sensing section of the two Hall sensors 32a and 32b is set to 20.0 degrees (θ=20°).

As described the sixth examples, even when the angle θ between the line 101 that perpendicularly bisects the short side of the rectangular solid magnet 31 and the line 102 connecting the centers of magnetism sensing section of the two Hall sensors 32a and 32b is set to 20.0 degrees, the size and the arrangement of the rectangular solid magnet 31 are varied. A position can be detected with a high precision (a precision of 0.5% to the position detection range) in a wide range.

However, in the sixth example, the size of the rectangular solid magnet 31, the distance 35a from the plane 100 of the rectangular solid magnet 3 opposite to the Hall sensors 32a and 32b to the center of magnetism sensing section of the Hall sensors 32a and 32b, the distance 35b between the center of magnetism sensing section of the Hall sensor 32a and the center of magnetism sensing section of the Hall sensor 32b, and the like are increased in some extent.

Accordingly, in order to perform position detection with a wide range at a high precision by use of a small-sized apparatus, the angle θ between the line 101 that perpendicularly bisects the short side of the rectangular solid magnet 31 and the line 102 connecting the centers of magnetism sensing section of the two Hall sensors 32a and 32b is preferably set to 67.0 to 89.3 degrees (θ=67.0° to 89.3°).

However, in a case that the size of apparatus is not an important factor, the angle θ between the line 101 that perpendicularly bisects the short side of the rectangular solid magnet 31 and the line 102 connecting the centers of magnetism sensing section of the two Hall sensors 32a and 32b is not particularly limited.

Seventh Example

A seventh embodiment of the present invention will be described. Here, the same reference characters are applied to parts corresponding to the above described examples, and an explanation thereof is omitted.

There will be described a case where position detection is performed over a range of 10 mm (±5 mm) at a resolution of 10 μm in a wide temperature range (with a precision of 0.1% relative to the position detection range) There will be described an example of designing parameters of the constituent components of FIGS. 1A and 1B.

In the above position detection, the length 34a of the rectangular solid magnet 31 in a long side direction X is set to 11.9 mm. The length 34b of the rectangular solid magnet 31 in a short side direction Y is set to 1.6 mm. The length 34c of the rectangular solid magnet 31 in a thickness direction Z (the length of the magnet in a magnetization direction) is set to 2.2 mm. The distance 35a from the plane 100 of the rectangular solid magnet 3 opposite to the Hall sensors 32a and 32b to the center of magnetism sensing section of the Hall sensors 32a and 32b is set to 0.8 mm. The distance 35b between the center of magnetism sensing section of the Hall sensor 32a and the center of magnetism sensing section of the Hall sensor 32b is set to 0.8 mm. The angle θ between the line 101 that perpendicularly bisects the short side of the rectangular solid magnet 31 and the line 102 connecting the centers of magnetism sensing section of the two Hall sensors 32a and 32b is set to 86 degrees (θ=86°).

As described above, the present invention can provide a position detection apparatus that can detect a position in a wide range of about 10 mm with a precision of 0.1% to the position detection range.

The invention claimed is:
1. A position detection apparatus comprising:
a magnetic flux detection means having one or more pairs of Hall sensors, each pair comprised of two Hall sensors, each Hall sensor arranged on a substrate and having a magnetism sensing direction orthogonal to a substrate direction; and a rectangular solid magnet having an N-pole and an S-pole magnetized in a direction orthogonal to the substrate, wherein the rectangular solid magnet is arranged movably in a direction orthogonal to a line connecting the centers of magnetism sensing sections of the each pair of two Hall sensors and is arranged movably in a plane parallel to the substrate, wherein the rectangular solid magnet has a long side and a short side of a quadrangle when the rectangular solid magnet is projected on any plane parallel to the substrate, and wherein the magnetic flux detection means is configured such that the position detecting of the rectangular solid magnet is performed based on the relationship between the movement quantity of the rectangular solid magnet and a differential magnetic flux density represented as a difference between a magnetic flux density at the position of one Hall sensor and a magnetic flux density at the position of the other Hall sensor in the each pair of two Hall sensors of the magnetic flux detection means, when the rectangular solid magnet is moved in a direction orthogonal to a line connecting the centers of magnetism sensing section of the each pair of two Hall sensors in a state that the long side of the rectangular solid magnet has a predetermined inclination angle to the line connecting the centers of magnetism sensing sections of the each pair of two Hall sensors of the magnetic flux detection means.

2. The position detection apparatus according to claim 1, wherein, in the ratio of length between the short side and long side of the rectangular solid magnet in a plane including a movement direction of the rectangular solid magnet, the length of the long side is set to 3.5 or more to 8.0 or less when the length of the short side is set to 1.

3. The position detection apparatus according to claim 1, wherein the length of a line connecting the centers of magnetism sensing sections of the each pair of two Hall sensors of the magnetic flux detection means is 1.0 mm or less, and a predetermined inclination angle of a long side direction of the rectangular solid magnet to a line connecting the centers of magnetism sensing sections of the each pair of two Hall sensors of the magnetic flux detection means is 67.0 to 89.3 degrees.

4. The position detection apparatus according to claim 1, wherein a position of the rectangular solid magnet can be detected with a precision of 1% or less to a movement range that the rectangular solid magnet.

5. The position detection apparatus according to claim 1, wherein a position of the rectangular solid magnet is calculated using a ratio between a difference between Hall output voltages of the each pair of two Hall sensors in the magnetic flux detection means and a sum of Hall output voltages of the each pair of two Hall sensors in the magnetic flux detection means.

6. The position detection apparatus according to claim 1, wherein the Hall sensor is a Hall sensor that does not have a magnetic chip for magnetic amplification.

7. The position detection apparatus according to claim 1, wherein the Hall sensor is a Hall sensor that includes III-V family chemical compound semiconductor such as GaAs, InAs or InSb.

8. The position detection apparatus according to claim 1, wherein the Hall sensor is a Hall sensor that includes IV family semiconductor such as Si or Ge.

9. The position detection apparatus according to claim 1, wherein the each pair of Hall sensors arranged on the substrate of the magnetic flux detection means is incorporated integrally into a single package.

* * * * *